May 5, 1953   F. B. BOLTE   2,637,076
REINFORCED CANOPY STRUCTURE
Filed Oct. 14, 1947

FRANK B. BOLTE
INVENTOR.

BY William R. Lane
ATTORNEY

Patented May 5, 1953

2,637,076

UNITED STATES PATENT OFFICE 2,637,076

REINFORCED CANOPY STRUCTURE

Frank B. Bolte, Los Angeles, Calif., assignor to North American Aviation, Inc.

Application October 14, 1947, Serial No. 779,667

4 Claims. (Cl. 20—40)

This invention pertains to reinforcement of material and particularly of sheet material composed of methyl methacrylate or like materials.

In the past considerable difficulty has been experienced in obtaining plastic structures having sufficient strength to enable their use for airplane canopies and particularly in connection with pressurized cabins. Attempts have been made to reinforce these structures with structural metals. However, this has resulted in complicated structures having impaired pilot visibility and other undesirable features, including those arising because of differences in the coefficients of expansion of the two materials.

It is therefore an object of this invention to provide an integral reinforced plastic structure which is conveniently and economically formed and yet has high strength characteristics.

It is another object of this invention to provide a reinforced plastic material which obtains a minimum impairment to visibility.

It is yet another object of this invention to provide a light weight relatively strong structure which is substantially homogeneous.

Figure 1:
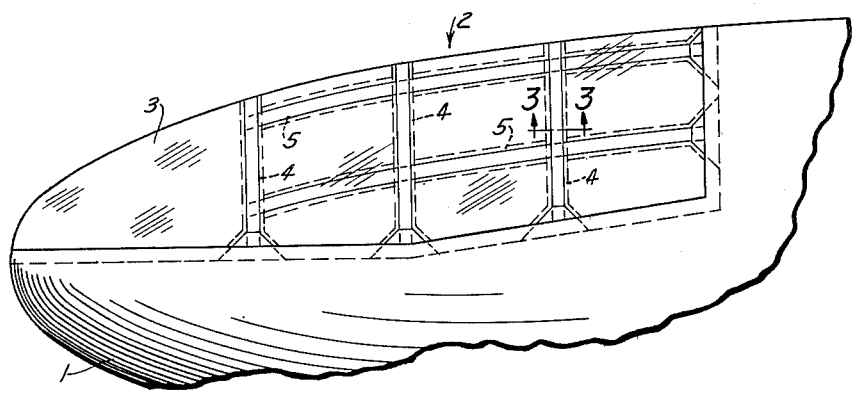
Figure 2:
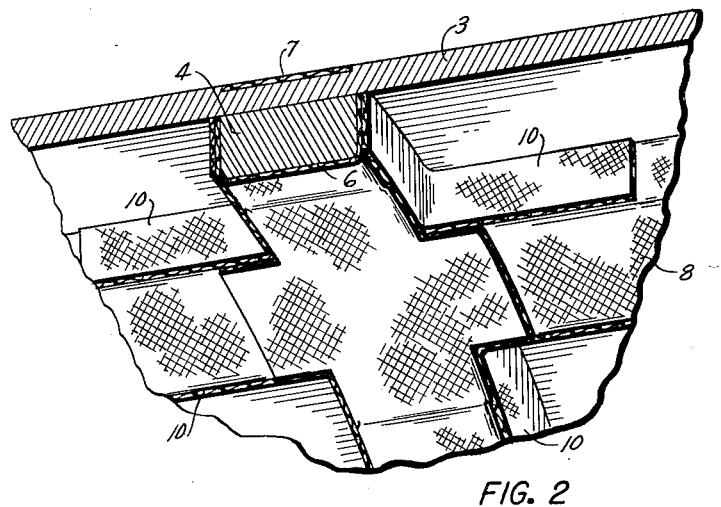
Figure 3:
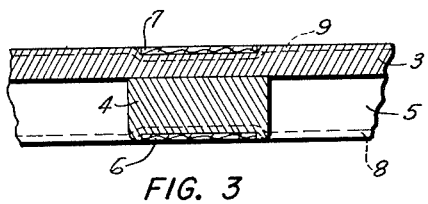

Other objects of invention will become apparent from the following description taken in connection with the accompanying drawings, in which Fig. 1 is an elevational view of a part of an airplane embodying the invention;

Fig. 2 is an enlarged perspective view of the underside of the canopy illustrated in Fig. 1, but modified by having part of the tape unrecessed; and Fig. 3 is a sectional view along the line 3—3 of Fig. 1.

Referring to the drawings, a structure 1, such as an airplane or the like, is provided with a transparent canopy portion 2 suitably attached thereto. In the preferred embodiment of the invention the transparent portion is formed of a relatively brittle shell substance 3, such as methyl methacrylate sheet material, stiffened by means of ribs 4 and spars 5, and reinforced with tapes 6, 7, 8, 9 and 10. The stiffening ribs and spars may be formed of the same material as the shell and attached thereto by a monomer cement or the like. The tape may be composed of ductile plastic, suitably treated fabric, woven glass fiber, or equivalent substance. Preferably the tape is formed of a synthetic linear polyamide of the types obtained by polymerization of diamines with dibasic acids or their amide-forming derivatives.

The tape is attached to the exterior or free face of the shell and to the interior or free face or faces of the stiffening elements. The exterior shell is preferably recessed for reception of the tapes 7 and 9, as illustrated in Fig. 3. Obviously, this is desirable when used in connection with airplane canopies, although it may be omitted where unnecessary. The spars and ribs on the interior are also recessed for the tapes 6 and 8, but this may be omitted, if desired, as illustrated in Fig. 2. Tape 10 attached to the respective sides of the ribs and spars, serves to stiffen the resulting structure and strengthen the same somewhat.

In any event, the tapes are relatively thin and any recesses used in connection therewith are correspondingly shallow, resulting in a substantially flush surface. Where tapes cross, the recesses may be correspondingly milled or cut out to insure a resulting flush surface.

By selecting tape and plastic material composing the shell and stiffening ribs of substantially identical indices of refraction, there obtains a relatively transparent reinforcing structure.

The resulting structure is well adapted to withstand forces and pressures to which it will be subjected under normal conditions of operation, and particularly in connection with pressurized airplane cabins. There results a considerable saving in weight, an increased percentage of unobstructed vision, saving in production cost, and a shatter-resistant structure. Further, the arrangement is flexible to the extent that the canopy may be design according to strength requirements, and particularly where it is desired to avoid shattering under conditions of operation where there is a possibility of it being struck by objects such as missiles. The reinforcing of the structure is particularly effective to prevent disintegration of the canopy upon impact with an object. This obviously enhances the safety factor of the cabin and particularly when utilized in connection with pressurized cabins.

The reinforcing elements 10 may be omitted if so desired and the reinforcing tape on the exterior surface of the canopy may be placed at other positions than opposite the ribs and spars.

Although the invention has been described and illustrated in detail, it is to be clearly understood that the same is by way of illustration and example only and is not to be taken by way of limitation, the spirit and scope of this invention being limited only by the terms of the appended claims.

I claim:

1. The process of forming a reinforced plastic structure comprising bonding acrylic plastic stiffening elements to a shell similar in composition to said stiffening elements, recessing the free faces of said shell and said elements, and bonding in said recesses strips of plastic material relatively strong in tension impregnated with a monomer cement so as to assure integral and continuous bonding of said strips to said shell and said stiffening elements, said recesses being formed to a depth which is substantially the thickness of said strip of material whereby said strips of material are substantally flush with said shell and said stiffening element when received in said recesses.

2. An aircraft canopy comprising a rigid transparent plastic shell adapted to engage portions of an aircraft at the edges of said shell; a grid of rigid transparent plastic reinforcing elements complementary to the interior surface of said shell and bonded thereto; a flexible transparent tension-resisting tape material bonded to the interior surface of said grid opposite said shell; additional tape material bonded to said shell on the outer surface thereof in a grid pattern corresponding to and disposed opposite from said grid of rigid plastic, said tape thereby providing said canopy with tension-resisting properties.

3. An aircraft canopy comprising a rigid plastic transparent lamina forming a shell for attachment to an aircraft; a second reinforcing lamina of rigid transparent plastic material, said reinforcing lamina having a grid-like pattern the outer surface thereof being complementary to the interior surface of said shell and bonded thereto, said reinforcing lamina having recessed portions on the surface thereof opposite from said shell; transparent tension-resisting tape received in said recesses and bonded to said reinforcing lamina; said shell being recessed opposite from said grid portions on the outer surface thereof; additional transparent tension-resisting tape received in said recesses of the shell and bonded thereto, said tape thereby providing said shell with a smooth exterior surface and tension-resisting properties.

4. An airplane canopy composed of a sheet of transparent material, a grid of ribs and spars integrally bonded to one surface of said sheet, and tension-resisting tape material integrally bonded to the other surface of said sheet and to said ribs and spars, said sheet material, ribs and spars, and tape material being transparent and having indices of refraction substantially the same.

FRANK B. BOLTE.

References Cited in the file of this patent

UNITED STATES PATENTS

| Number | Name | Date |
|---|---|---|
| 2,193,469 | Ashton | Mar. 12, 1940 |
| 2,230,393 | Thomson | Feb. 4, 1941 |
| 2,258,724 | Wagner et al. | Oct. 14, 1941 |
| 2,278,369 | Hall | Mar. 31, 1942 |
| 2,348,287 | Fiekers | May 9, 1944 |
| 2,382,963 | Dodge | Aug. 21, 1945 |
| 2,385,684 | Burton et al. | Sept. 25, 1945 |
| 2,427,065 | Nebesar | Sept. 9, 1947 |
| 2,482,798 | Rheinfrank, et al. | Sept. 27, 1949 |
| 2,503,450 | Nebesar | Apr. 11, 1950 |
| 2,511,168 | Martin et al. | June 13, 1950 |

OTHER REFERENCES

"Lucite" methyl methacrylate resin manual, pp. 51–58, received Feb. 28, 1944, TP986.L9D9.